(12) United States Patent
Kohl et al.

(10) Patent No.: US 6,920,563 B2
(45) Date of Patent: Jul. 19, 2005

(54) SYSTEM AND METHOD TO SECURELY STORE INFORMATION IN A RECOVERABLE MANNER ON AN UNTRUSTED SYSTEM

(75) Inventors: Ulrich Kohl, Mountain View, CA (US); Jeffrey Bruce Lotspiech, San Jose, CA (US); Stefan Nusser, Boca Raton, FL (US)

(73) Assignee: International Business Machines Corporation, Armonk, NY (US)

(*) Notice: Subject to any disclaimer, the term of this patent is extended or adjusted under 35 U.S.C. 154(b) by 837 days.

(21) Appl. No.: 09/754,396

(22) Filed: Jan. 5, 2001

(65) Prior Publication Data

US 2002/0091930 A1 Jul. 11, 2002

(51) Int. Cl.[7] .............................. H04L 9/32; H04L 9/00
(52) U.S. Cl. ...................... 713/189; 713/191; 713/193; 380/277; 380/286
(58) Field of Search ................................ 380/277–281, 380/284–286, 46; 713/165, 189, 193, 191; 705/50, 59, 71; 707/1, 9, 10, 200–202

(56) References Cited

U.S. PATENT DOCUMENTS

| | | | |
|---|---|---|---|
| 5,673,316 A | | 9/1997 | Auerbach et al. |
| 5,892,900 A | | 4/1999 | Ginter et al. |
| 5,910,987 A | | 6/1999 | Ginter et al. |
| 5,915,019 A | | 6/1999 | Ginter et al. |
| 5,917,912 A | | 6/1999 | Ginter et al. |
| 5,982,891 A | * | 11/1999 | Ginter et al. .................. 705/54 |
| 6,549,626 B1 | * | 4/2003 | Al-Salqan .................... 380/286 |

* cited by examiner

*Primary Examiner*—Hosuk Song
(74) *Attorney, Agent, or Firm*—Mark McCabe, Esq.; McGinn & Gibb, PLLC

(57) ABSTRACT

A method (and system) for storing information in a recoverable manner on an untrusted system, includes sending, by a client, a request to a recovery server for recovery of a failed database, determining whether the request is legitimate, based on the determining, sending a local key to the client, decrypting by the client the failed database with the local key, to recover the failed database, and re-encrypting the recovered database with a new key.

36 Claims, 4 Drawing Sheets

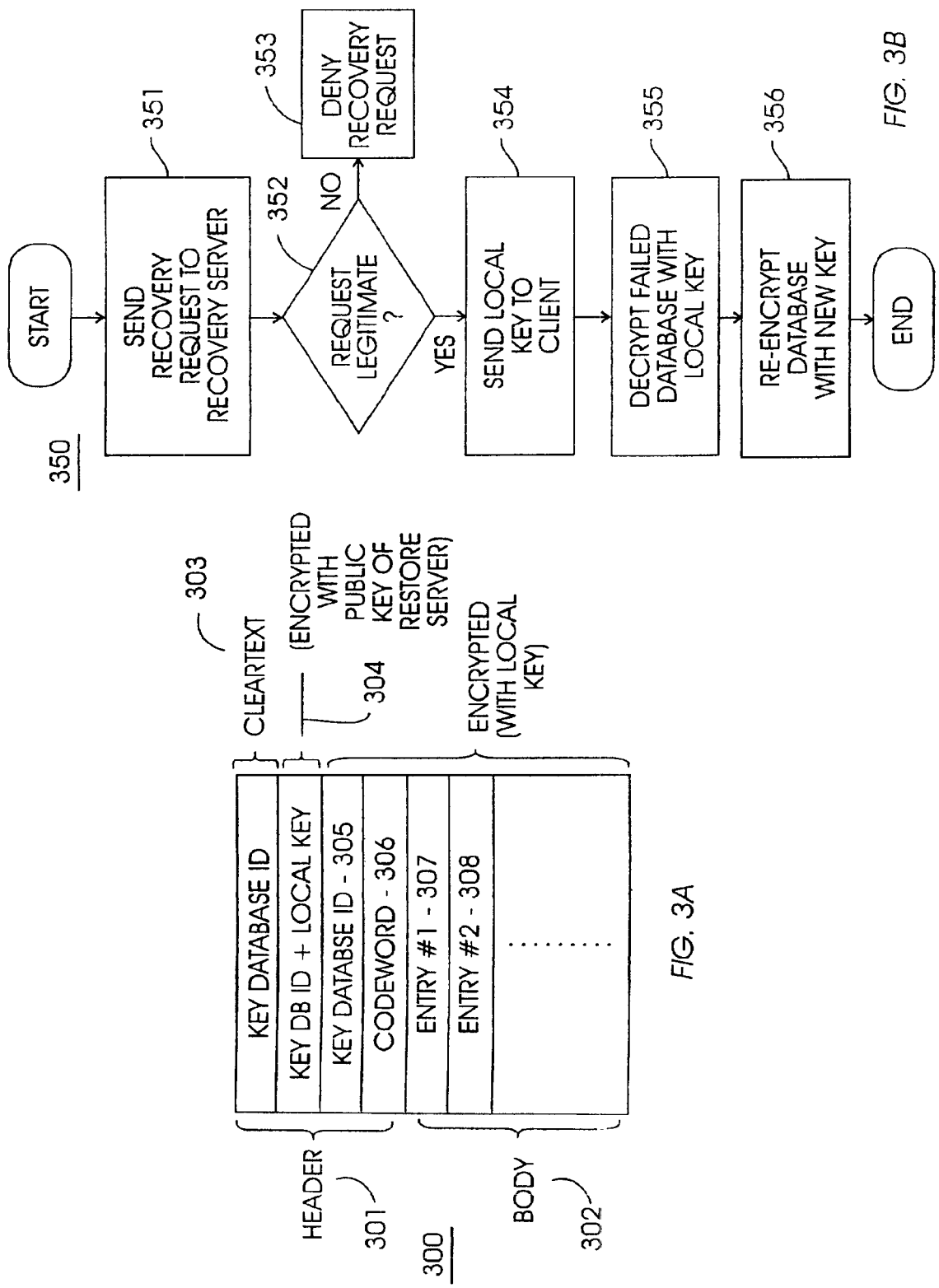

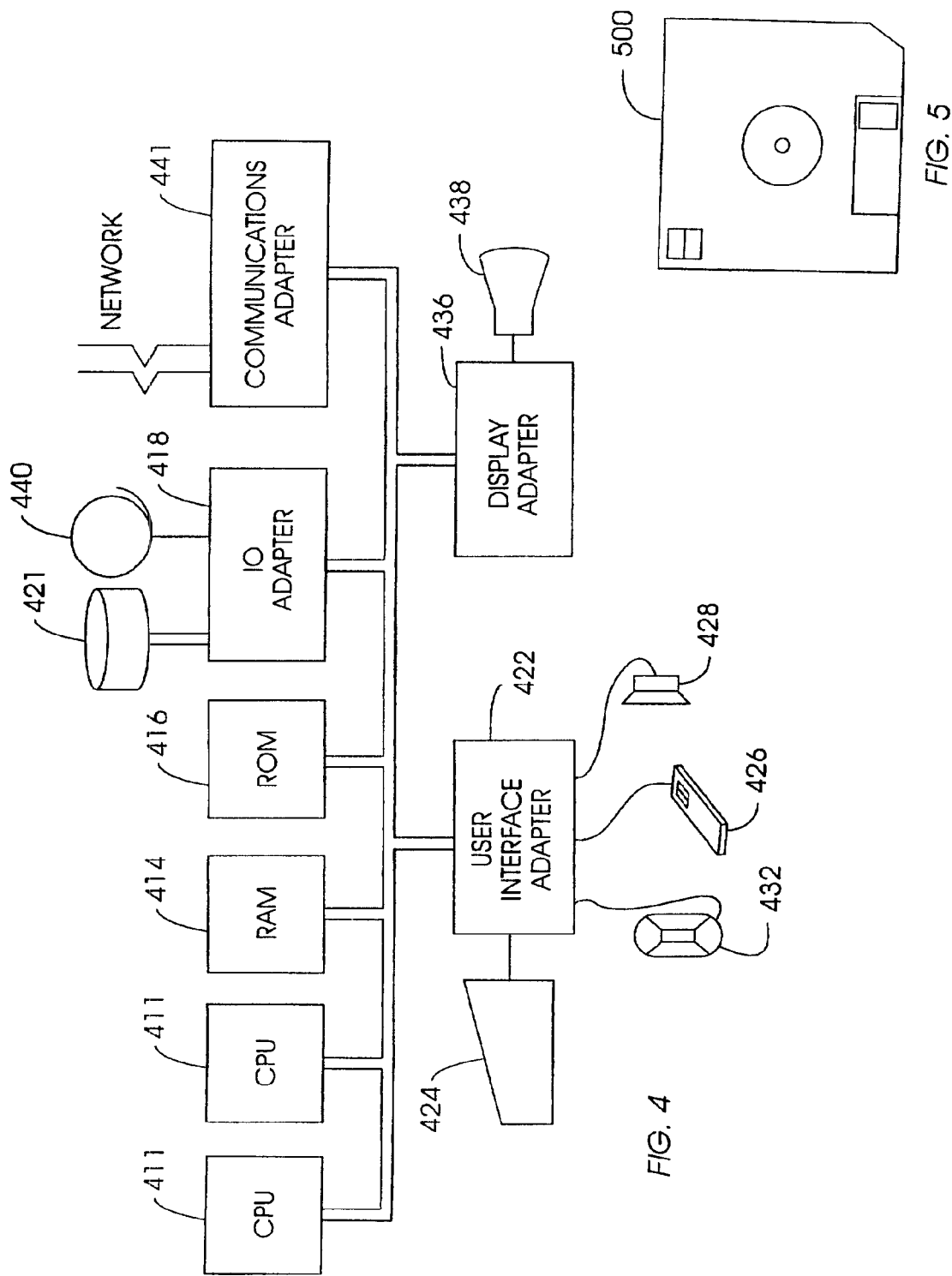

SYSTEM AND METHOD TO SECURELY STORE INFORMATION IN A RECOVERABLE MANNER ON AN UNTRUSTED SYSTEM

BACKGROUND OF THE INVENTION

1. Field of the Invention

The present invention relates to a system and method for storing information, and more particularly to a system and method for storing information in a recoverable manner on an untrusted system.

2. Description of the Art

Many distributed applications must handle (i.e., process or store) information on untrusted systems. Some types of information (e.g., digital music, movies, etc.) should be protected against illegal use or copying. A common protection scheme is to encrypt the information and only allow the end-user's application program to decrypt and use it. The end-user application is provided by the owner or seller of the information (e.g., the content owner), and can be designed to be tamper-resistant or tamper-detecting, and thus provides a higher level of trustworthiness.

To perform its task, the end-user application must know and protect the key used to decrypt the information. It is possible for the user's application to have randomly picked the key when it was first recorded, but that leads to a problem. If there is nothing special about the keys (e.g., completely random), one user can give all the application, data, and keys to another user, and the information would be equally usable by the second user. Of course, the second user would not have paid for the original data. This is a problem.

Thus, merely placing the content (e.g., music) in any conventional database raises several problems. First, the user can give that database (e.g., the music) to a second user (e.g., his friend) and the user's friend gets the database/music without having paid for it.

Further, if one merely uses a play count (e.g., some of the music labels are interested in this aspect and provide a listener with a test play(s) (e.g., providing five free test plays before the user must buy it)) by placing a code or counter on the music (e.g., on the disk) to limit the number of plays that a user can hear, the user/hacker could find the counts and save the file with the count stored (or restored) at its original value. Thus, if the user can simply copy the database from system to system or save and restore them easily on the user's own system, then this is a problem.

Another problem is that, from time to time, users legitimately must update their personal computers, to improve the processor, to add or replace hard disks due to system crashes, etc. Such legitimate users typically would like to have their database (e.g., music) migrated from one computer system to another. Thus, depending on what the update is, customizing information needed for "secret keys" may no longer be correct, and the user may be in the unhappy position of being unable to play music, for example, that he has previously purchased.

Notwithstanding the above, it is extremely difficult to know absolutely which case is present (e.g., did the user fraudulently give the database to a friend or is the user legitimately updating his own computer system for his own use, etc.). Hitherto the invention, this has been a problem as there has been no system or method in which to store the local key on the user's machine for backup and update purposes which does not at the same time allow the backup/update mechanism to be used as a source of unauthorized copies.

Indeed, both the IBM Cryptolope® and the Intertrust digiBox® systems are able to protect intellectual property at a client station, and the recovery problem has been identified. That is, the IBM Cryptolope system as disclosed in U.S. Pat. No. 5,673,316, incorporated herein by reference, needs a central entity, the clearing center, to remember the usage conditions every client has. For crash recovery, preferably clients must "purchase" again all cryptolopes (i.e., pieces of content) they had before, and the clearing center will not charge them the second time. However, this is a complicated process, especially for clients with large content collections. Further, the Cryptolope system does not include a recovery mechanism other than repurchasing.

The Intertrust digiBox system can discover a backup operation being performed. However, there is no adequate recovery process and this is another example of an application in need of a good restoration process.

SUMMARY OF THE INVENTION

In view of the foregoing and other problems, disadvantages, and drawbacks of the conventional methods and structures, an objective of the present invention is to provide a method and system for storing information in a recoverable manner on an untrusted system.

In a first aspect of the present invention, a method (and system) for storing information in a recoverable manner on an untrusted system, includes sending, by a client, a request to a recovery server for recovery of a failed database, determining whether the request is legitimate, based on the determining, sending an old local key to the client, decrypting by the client the failed database with the old local key, to recover the failed database, and re-encrypting the recovered database with a new local key.

With the unique and unobvious aspects and features of the present invention, information can be stored in a recoverable manner on an untrusted system and yet fraud and theft/unauthorized use of a database (e.g., music, video, etc.) can be prevented.

Further, in the present invention, in many cases, only keys, not data, need be transferred to the end user, and thus the backup/update operation can be substantially more efficient than the "download again" method used in the conventional method described above.

BRIEF DESCRIPTION OF THE DRAWINGS

The foregoing and other purposes, aspects and advantages will be better understood from the following detailed description of a preferred embodiment of the invention with reference to the drawings, in which:

FIG. 3A illustrates a key database 300 including a header 301 and a body 302 of a message to be sent between a client 10 and the recovery server 20;

FIG. 3B illustrates a method 350 of storing information in a recoverable manner on an untrusted system, according to the present invention;

FIG. 4 illustrates an exemplary hardware/information handling system 400 for incorporating the present invention therein; and FIG. 5 illustrates a signal bearing medium 500 (e.g., storage medium) for storing steps of a program of a method according to the present invention.

DETAILED DESCRIPTION OF PREFERRED EMBODIMENTS OF THE INVENTION

Figure 1:
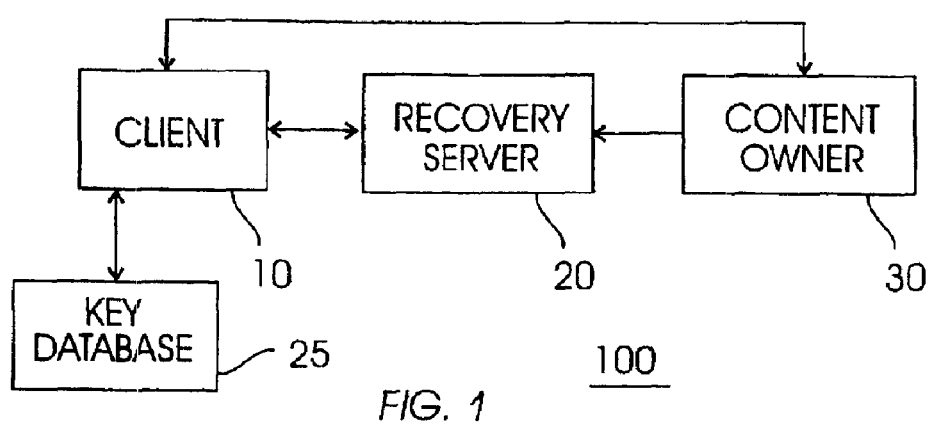
FIG. 1 illustrates an upper-level environment of the present invention.

Referring now to the drawings, and more particularly to FIGS. 1–5, there are shown preferred embodiments of the method and structures according to the present invention.

Turning to FIG. 1, an upper level environment 100 according to the present invention is shown, which includes a client 10, a recovery server 20, and a content owner 30.

As mentioned above, the client 10 typically contacts and purchases content (e.g., music, video, etc.) from the content owner 30 and stores it, along with a keyword or codeword, on a database on the client 10. With such a code word/keyword, if the client has a problem, then the client can access the recovery server 20 with the key/codeword to restore the database. Preferably, there is a unique key for each piece of content and an overall key for the entire key database (e.g., on the client side).

The recovery server 20 functions to allow a legitimate client (e.g., user) 10 of a database 25 to obtain a key to access the database 25 again when the legitimate user's computer system must be upgraded, is replaced, or undergoes a system crash affecting the previously legitimately stored content in the database.

Figure 2:
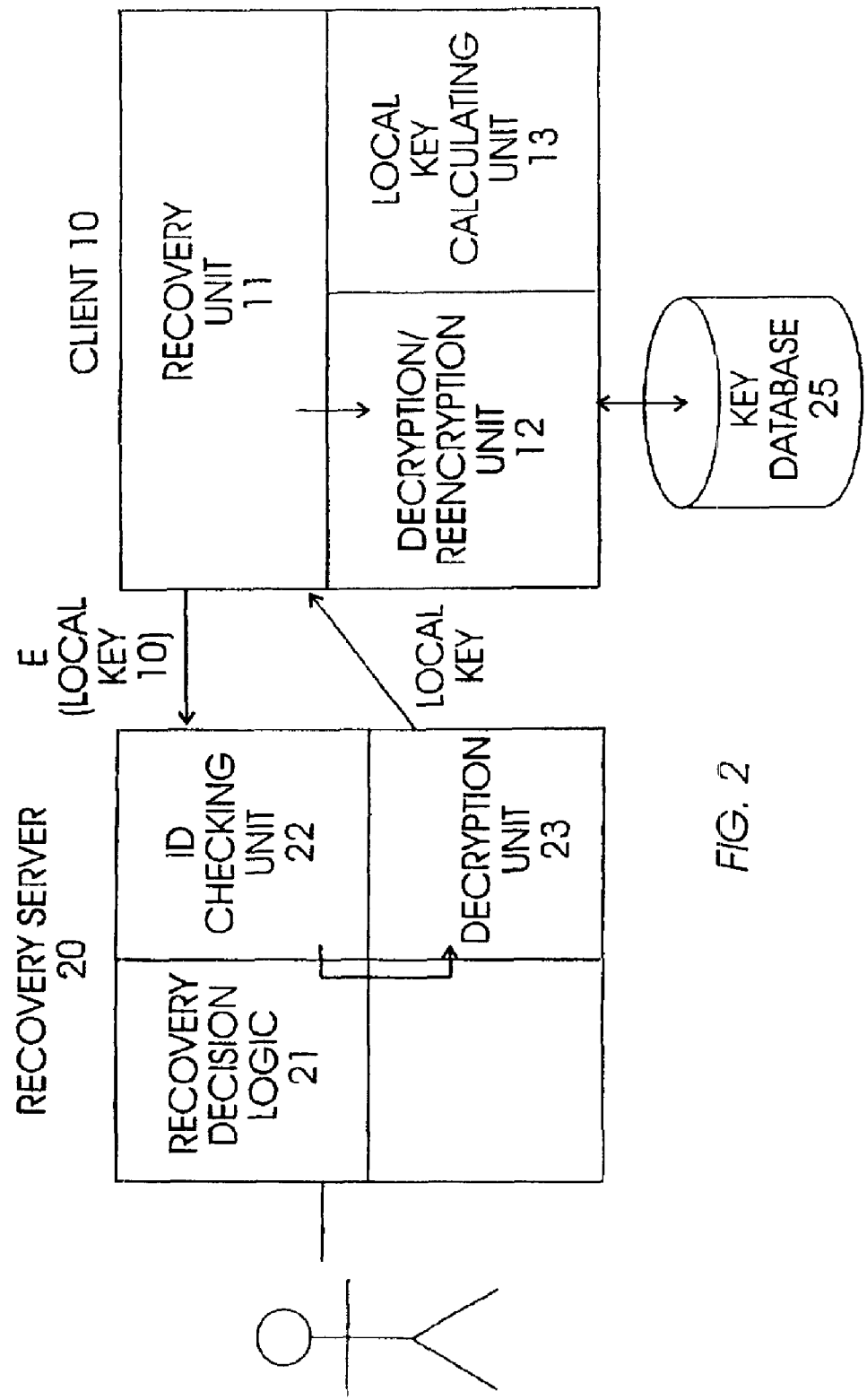
FIG. 2 schematically illustrates a block diagram of the operation between a recovery server and a client according to the present invention.

Referring to FIG. 2, the detailed construction and interaction between the client 10 and the recovery system 20 will be described in hereinbelow.

The client 10 includes a recovery unit 11, a decryption/re-encryption unit 12, and a local key calculator 13.

The recovery server 20 includes a recovery decision logic unit 21, an Identification (ID) checking unit 22, and a decryption unit 23.

With the above structure, to prevent a user from moving the database from one place to another (e.g., to an unauthorized friend), there is a secret function (key) which is provided with the content. That is, the music is protected with a key which is dependent upon unique characteristics of the computer (e.g., the CPU serial number, the computer's Ethernet card, etc.) on which the content is loaded. Thus, the invention customizes the key(s) so they are only usable on the original user's machine. Any and all methods of customizing the keys are within the scope of the present invention. Hereinbelow are listed the following examples, which can be used alone or in combination:

1. base the key on the processor ID;

2. base the key on the particular sectors of system files; and 3. base the key on random data stored in a non-volatile area that is hard for the user to copy (e.g., processor nonvolatile random access memory (NVRAM)).

Obviously, other methods are possible. By "base", it is meant that the customizing information passes through a secret function before producing the key, which is called the "local key". All secret functions are within the scope of the present invention. For example, a secret function could be a linear congruential random number generated seeded by the customizing information.

In addition to being customized to fixed information in the user's computer, it is also desirable that the local key also depend on variable information that can be changed from time to time. That is, the local key should change whenever a user changes a count, installs new music, etc. The variable information must be carefully placed in a secret location in the system to prevent the hacker from finding the values and changing the values. For example, a secret location may be a system's basic input/output system (BIOS), the nonvolatile RAM (NVRAM), the hard disk, etc.

Thus, there are two components to the "calculation" that determines the local key. That is, there are some values unique to the system and some values that are in the one or more "secret" location(s) which change every time a predetermined action occurs. In one implementation, a counter could simply be stored in the secret, nonvolatile location and simply incremented. Hence, when an authorized user believes he has performed a "save-restore" operation to fraudulently obtain the music, but does not know about this secret location, the restored value will be restored with the wrong key, since the key will be calculated from a different (e.g., incorrect) value.

For example, an unauthorized user may save everything the user can find and then restore the disk to erase the count (or step the count back). That is, the user is allowed five plays and has played four of the plays, but the user has saved the music before the user starting playing it. The unscrupulous user could attempt to put the disk back to five play counts. Hence, it is desirable to prevent the user from putting the disk back to the five counts. Everything the user has noticed that has changed, the user has saved, but as provided in the invention there is something subtle in the system and the invention also saves values related to these items. Thus, if the user performs a save and tries to restore the old data in the database, the secret value(s) at the secret locations will have different values from when the value(s) were originally saved. Hence, the values saved are no longer correct and they would not be decrypted correctly.

Thus, with the combination of the local storage and the nonvolatile locations, a unique key can be produced which the user can calculate with a secret function, according to the present invention.

However, as alluded to above, the problem is that users must at times update their personal computers, to improve the processor, or to add or replace hard disks. Depending on what the update is, the customizing information may no longer be correct, the local key calculation will produce a different key, and the user may be unable to play music, for example, that he has previously (and legitimately) purchased.

However, as mentioned above, the secret key prevents "evil" (fraudulent) uses but does not allow a legitimate use of the database due for a legitimate user such as a user updating or replacing his equipment due to a lost hard disk, etc. Thus, the invention also provides a mechanism (or path) for recovering the database, in the legitimate case, in which the database can be recovered and successfully migrated to a new hard disk or a new system. This is performed by using the recovery (restore) server 20.

For example, if the hard disk has crashed and one of the secret values of generating the key was the serial number of the CPU/hard disk which has been lost, then it would be difficult (or impossible) to know what the value ever was because of the crash of the hard disk. Thus, the restore server 20 allows a way of knowing the old value in the old hard disk in order to give the user 10 the new value for the new hard disk.

Hence, as shown in FIG. 3A, when (e.g., every time) the invention stores the old database, also stored is the local key (e.g., a keyword in a header) that was used with the old database, and the key is encrypted in a way such that it can be decrypted only by the restore server 20. Specifically, only the restore server 20 can decrypt since the restore server uses public key cryptography which means that any user can encrypt for the restore server, but only the restore server 20 knows how to decrypt/read.

The keyword does not necessarily imply that a user 10 is authorized to perform a restore. Quite simply, every database (even one illegitimately copied) has a restore keyword. However, upon a request to perform a restore, then a decision must be made as to whether it is a legitimate request (e.g., hard disk crash, etc.) for a restore or a fraudulent, illegitimate request. On the surface, it is difficult to determine what the nature is of a particular request. It will look the same from the point of view of the client 10, with the database having a restore field with a restore value in the header along with the identification (ID) and a new disk identification (which may be the same or different disk) which the database is to placed on.

In an exemplary embodiment, a user is allowed five "free" plays, thereby allowing five automatic restores without human intervention. After five plays, then a call is placed to a human (e.g., at a 1-800 telephone number) and the human operator will question the user as to why the restores are necessary. Then, the human operator judges whether to allow any future restores, following some rules (described in further detail below) which indicate suspicious (or normal) activity or not. Assuming that the human operator decides that a legitimate restore is involved (as opposed to someone trying to cheat), then the human operator resets ("bumps") the user's count to allow more automatic restores.

Again, it is noted that the client/user knows how to encrypt any new database since the client 10 has the secret function and knows how to perform the calculation with the nonvolatile locations, etc. What the client 10 has lost (e.g., due to replacing a disk) is the old value of the key. The restore server 20 provides the old value of the key and allows the client 10 to restore/update by providing the old key to the client.

Thus, the invention allows storing the local key on the user's machine for backup and update purposes. Of course, this key is not stored in the clear, but it is also encrypted. For example, it is encrypted in the public key of a publicly known server (e.g., the "recovery server" 20). It is noted that the present invention assumes the existence of a trusted recovery server. The mechanisms described herein assume that the user performs an initial registration with the recovery server. During this registration process, which might be automated and transparent for the user, the recovery server must be authenticated as such in order to prevent an attacker from running their own recovery server. Alternatively, the address and public key of the recovery server could be wired into the client code in a tamper-resistant way.

Thus, if the local key is not correct (e.g., due to a system upgrade), the end user application extracts the encrypted key, and sends it to the recovery server 20. The recovery server 20 decides whether it should allow the recovery, and if so, decrypts the key and sends it back to the end-user application which is then able to decrypt the information and re-encrypt it with a new valid local key.

As mentioned above, for many types of content, the content owners 30 may wish to enforce counts. For example, a user may be given only five "plays" of a piece of music. Thereafter, the user must obtain another license by payment of a fee for another predetermined number of plays. Alternatively, the user could simply buy the copy outright for unlimited plays.

As mentioned above, the present invention supports this requirement. That is, if the data in the non-volatile area is changed every time the count changes, then the local key also changes, and the user is not able to reset his count by simply saving the content and all associated files before the play and restoring it afterwards.

Although these direct approaches described above are fully functional as they stand, another aspect of the present invention is to add one level of indirection to raise the efficiency.

That is, instead of always decrypting and re-encrypting all of the bulk data which must be secured, it is faster to generate random keys and use them to encrypt the data, and use the invention only to manage and secure the random keys in a key database. If the end user application wants to access some local data, the user must calculate the key database key, then retrieve the right bulk encryption key from the database 25, and then decrypt the information.

This is true if the count is kept in the content itself (e.g., as a watermark or just as an attachment to the file). The present inventors have implemented counters which are kept in the records of the key database, and the changing of the local key protects against saving and restoring the key database 25 in a form of a replay attack.

It is noted that the method of how the sensitive information is given to the untrusted station does not really matter. However, this method perfectly complements secure container technologies like the IBM Cryptolope® or the IBM Electronic Medium Management System (EMMS) secure container system, as described in U.S. Pat. No. 5,673,316, entitled "CREATION AND DISTRIBUTION OF CRYPTOGRAPHIC ENVELOPE", incorporated herein by reference.

Here, information is also delivered in an encrypted way. The Cryptolope player (e.g., an example of a trusted end user application program) will contact a clearing center (which may also serve in the role of a recovery server) and purchase the unlocking key, and then decrypt the content. The EMMS Player SDK will contact a clearinghouse and receive the unlocking key, and then decrypt the content. With the use of a key database, the EMMS Player SDK stores the decryption keys.

Preferred Embodiment

The invention assumes that the end user application and especially the part of it which implements the invention (e.g., the "key database manager") is tamper-resistant, so it cannot be debugged easily. This ensures that the embedded key calculation code cannot be uncovered, or disassembled. Tamper-resistant software is common in the industry, although the techniques are usually kept as trade secrets rather than patented, and thus will not be described further herein. It is sufficient to indicate that the present invention advantageously uses tamper-resistant software to be practical. However, techniques of tamper-resistance are not part of this invention.

For the rest of this description, it will be assumed that the invention will be applied to a key database 25 which, for purposes of the present invention, is described as a file of keys and/or counts, themselves encrypted in the local key. However, the techniques could be equally applied directly on the content, without the key database 25. The key database 25 itself is constructed so that it can be easily detected whether the constructed key is correct, or wrong because of tampering or a system modification. For example, the prefix of the encrypted part of the database might always be a constant string, like X'DEADBEEF'. Additionally, it supports the above described recovery.

Returning to FIG. 3A, the key database 300 is shown.

The key database 300 (e.g., a flat file database) includes a header 301 and a body 302. The first part of the header 301 is not encrypted with the local encryption key. However, the rest of the key database 25 is encrypted with the local encryption key.

The cleartext part 303 of the header 301 contains a key database ID which is unique among all the users. This ID serves as an identification during recovery.

A second part 304 of the header 301 is a combined item which contains the local encryption key, or at least the variable parts of the key, and the key database ID, encrypted with the recovery center's public key, such that this item is only "in the clear" regarding the local key database key.

The rest of the key database 300 is encrypted with the local key. It contains the rest of the header 301, which includes the key database ID 305 and a well-known codeword 306 such as X'DEADBEEF' or the like as determined by the designer. These fields serve to check whether the key was calculated correctly or the system was modified or tampered with.

The entire body 302 is encrypted with the local encryption key. Its format (e.g., entries 307, 308, etc.) can be arbitrarily defined, either records with fixed field lengths or variable lengths with length fields.

In the case of recovery after a system crash or modification, the variable parts of the key get changed, and the decryption key for the database 300 cannot be reconstructed locally and must explicitly be recovered. (Further, the decryption key might also be wrong due to tampering, if the user has changed the key database to an earlier version.). Failure to reconstruct the decryption key locally can be recognized by checking for the well-known codeword in the decrypted protected portion of the key database. If the codeword string does not match, then the local reconstruction of the decryption key failed. In this case, the end user application program must extract the second field from the cleartext key database header. This field contains the lost key or its significant parts, but is encrypted with the recovery center's public key, so that only the recovery center (restore server) can decrypt it using its private key. The client 10 sends this field to the recovery center 20, which can check the legality of this action, decrypt the key and send it back. Then, the end user application can decrypt the old key database 25, generate a new key and set the system parameters accordingly and encrypt the key database 25 again.

As mentioned above, the recovery server 20 might have built-in heuristics to determine whether or not to automatically grant the recover operation. For example, certain actions are likely innocent and likely to be granted routinely:

1. Normal user upgrade. Infrequent (e.g., one to two years) recovery operations from a data base ID, each time to a different system.
2. User recovery of the failing machine. Several frequent recoveries (within one to two days) from one ID to a single system.

On the other hand, some patterns are more likely to be evidence of fraud:

1. Coalition of users sharing data. Periodic recoveries of a single ID from one particular system to another, or switching between a fixed group of systems to another
2. User "recovery" to reset his counts. Periodic recoveries, always to the same system.

In the exemplary implementation, the heuristic used is that the user will have only 5 automatic recoveries allowed. Obviously, as would be known by one of ordinary skill in the art after taking the present specification as a whole, more complicated heuristics are required.

As further mentioned above, if a proposed recovery fails the heuristic, the user would be invited to call an 800 number to explain the situation. One aspect of the invention is for the 800 operator, if he/she decides to grant the recovery, to merely reset the failing heuristic for that data base ID, allowing the user to perform the recovery with the normal mechanism.

Again, an aspect of the invention, as shown above, is that the database ID is part of the encrypted section as well as part of the unencrypted header of the key database. After performing a recovery procedure, the SDK compares the key database ID used for the recovery (which was obtained from the unencrypted portion of the header) with the now accessible key database ID in the encrypted header. If there is a mismatch, then the recovery procedure is aborted. Thus, a cheating user cannot undetectably tamper with ID, in order to avoid the fraud heuristics.

Turning to FIG. 3B which illustrates a method 350 of the operation of the invention, in step 351 a user 10 (e.g., legitimate or illegitimate) requests a restore from the recovery server 20.

In step 352, the recovery server 20 determines whether the request is legitimate. That is, the recovery server 20 checks/verifies the key database ID of the user 10 with an ID checking unit and assuming that the ID matches a predetermined ID (e.g., matches an ID that was previously registered with the recovery server), then applies the recovery decision logic (heuristic).

Assuming that the key database ID is found in the recovery server's database, the recovery server 20 may grant the restore depending on the decision heuristic deployed. That is, if decision logic is applied favorably to the user (e.g., such decision logic may be automatic or manual), then the recovery server 20 decrypts the message to grant the restore and to provide the local key.

If the request is deemed to be not legitimate (e.g., a "NO" in step 352), then the process proceeds to step 353 to deny the request.

Assuming a "YES" in step 352, then, in step 354, the old local key (e.g., the key that the old, corrupted database was incorporated with) is sent to the user such that the recovery unit 11 in the client 10 can begin a restore operation.

In step 355, the user takes the old local key and calculates the new local key by decrypting (with the decrypting/reencryption unit 12) the old, allegedly corrupted database with the old key. Then, the old database 25 can be re-encrypted with the new key.

Thus, with the unique and unobvious features of the present invention, a facility is provided which information can be stored in a recoverable manner on an untrusted system and yet fraud and theft/unauthorized use of a database (e.g., music, video, etc.) is prevented.

FIG. 4 illustrates a typical hardware configuration of an information handling/computer system in accordance with the invention and which preferably has at least one processor or central processing unit (CPU) 411.

The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting an information handling system to a data processing network, the Internet, an Intranet, a personal area network (PAN), etc., and a display adapter 436 for connecting the bus 412 to a display device 438 and/or printer 439 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 411 and hardware above, to perform the method of the invention.

This signal-bearing media may include, for example, a RAM contained within the CPU 411, as represented by the fast-access storage for example. Alternatively, the instructions may be contained in another signal-bearing media, such as a magnetic data storage diskette 500 (FIG. 5), directly or indirectly accessible by the CPU 411.

Whether contained in the diskette 500, the computer/CPU 411, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While a preferred embodiment of the present invention has been described above, it should be understood that it has been provided as an example only. Thus, those skilled in the art will recognize that the invention can be practiced with modification within the spirit and scope of the appended claims.

Having thus described our invention, what we claim as new and desire to secure by Letters Patent is as follows:

1. A method for storing information in a recoverable manner on an untrusted system, comprising:
   sending, by a client, a request to a recovery server for recovery of a failed database;
   determining whether said request is legitimate;
   based on said determining, sending an old local key to the client;
   decrypting by said client the failed database with the old local key, to recover the failed database; and
   re-encrypting the recovered database with a new local key,
   wherein at least one of said old local key and said new local key is based upon at least one unique characteristic of a hardware component associated with said database.

2. The method of claim 1, further comprising:
   verifying whether a key database identification has been tampered with.

3. The method of claim 1, wherein said database is associated with content which is purchased from a content owner and stored, along with a keyword or codeword, on the database of the client.

4. The method of claim 3, wherein the client can access the recovery server with the keyword to restore the database.

5. The method of claim 1, wherein said at least one of said old local key and said new local key comprises one of a unique key for each piece of content in said database and an overall key for the entire database.

6. The method of claim 1, wherein at least one of said old local key and said new local key is based on at least one of a processor identification, a particular sector of a system file and random data stored in a non-volatile area of a computer system of said client.

7. The method of claim 6, wherein said random data comprises values placed in a secret location comprising any of a system's basic input/output system (BIOS), a nonvolatile RAM (NVRAM), and a hard disk.

8. The method of claim 6, said non-volatile area of said computer system comprises an area of a computer system that is not protected by a backup operation.

9. The method of claim 1, wherein said at least one of said old local key and said new local key is further based on a value in at least one secret location which changes every time a predetermined action occurs.

10. The method of claim 9, further comprising:
    storing a counter in the secret, nonvolatile location; and
    incrementing the counter.

11. The method of claim 9, further comprising;
    incrementing a counter periodically; and
    storing the counter to the nonvolatile location such that a restored value will be saved with a wrong key.

12. The method of claim 1, wherein said local key is based on a combination of values stored in a local storage and a nonvolatile location of a computer system of said client.

13. The method of claim 1, wherein the database is encrypted with said local key, and said local key is decryptable only by the recovery server.

14. The method of claim 13, further comprising decrypting the old local key at the recovery server using public key cryptography.

15. The method of claim 1, wherein said recovery server automatically provides said old local key in response to a first request.

16. The method of claim 15, wherein said request is sent from the client to the recovery server if the old local key is not correct, wherein said request further comprises the encrypted old local key.

17. The method of claim 16, wherein if the recovery server determines that said request is legitimate said method further comprises:
    decrypting the old local key.

18. The method of claim 1, wherein data is stored in a non-volatile area of a machine of said client, and further comprising:
    changing data and said old local key every time a count changes.

19. The method of claim 1, wherein re-encrypting the recovered database with the new local key comprises:
    encrypting a random key using said new local key; and
    re-encrypting the recovered database using said random key.

20. The method of claim 1, wherein counters are kept in records of the database, and the local key is used to encrypt the counters.

21. The method of claim 1, wherein the request comprises a header and a body, and wherein all but a first portion of the header is encrypted with said old local key.

22. The method of claim 21, wherein said header comprises a cleartext portion of the header that comprises a unique database identification.

23. The method of claim 22, wherein said header further comprises a second portion comprising said old local key and the database identification, wherein said second portion of said header is encrypted with a public key from the recovery server.

24. The method of claim 23, wherein said failed database comprises said header and fields which are encrypted with the old local key wherein said header further comprises a codeword.

25. The method of claim 24, wherein said failed database comprises a body encrypted with the old local key.

26. The method of claim 25, wherein said old local key for the database cannot be reconstructed locally and must explicitly be recovered, such that a client application program extracts said second portion from said cleartext portion of the header,
   wherein said second portion comprises said old local key that is encrypted with said public key, wherein sending said request from said client comprises sending the second portion to the recovery server.

27. The method of claim 1, wherein said determining whether said request is legitimate comprises:
   determining based on any of whether a normal user upgrade is due, and whether a predetermined tune period has elapsed between a user recovery of a failing machine.

28. The method of claim 1, wherein said determining whether said request is legitimate comprises:
   resetting parameters in a decision logic; and
   requesting another request from the client.

29. A method of allowing recovery of a proprietary database, comprising:
   receiving, from a client at a recovery server, a request to restore a database;
   determining, by the recovery server, whether the request is legitimate by verifying a key database identification included in the request of the user;
   if the key database identification matches a predetermined identification, then applying a recovery decision logic, and granting the restore request to the client by the recovery server;
   forwarding an old local key to a user; and
   calculating a new local key by decrypting the database with said old local key by said client,
   wherein at least one of said old local key and said new local key is based upon at least one unique characteristic of a hardware component associated with said database.

30. The method of claim 29, further comprising:
   resetting certain parameters in the decision logic; and
   requesting another request from the client.

31. A system for storing information in a recoverable manner on an untrusted system, comprising:
   means for sending, by a client, a request to a recovery server for recovery of a failed database;
   means for determining whether said request is legitimate;
   based on an output from said means for determining, means for sending an old local key to the client;
   means for decrypting, by said client, the failed database with the old local key; and
   means for re-encrypting the recovered database with a new local key,
   wherein at least one of said old local key and said new local key is based upon at least one unique characteristic of a hardware component associated with said database.

32. The system of claim 31, further comprising:
   means for resetting parameters in a decision logic; and
   means for requesting another request from the client.

33. A system of allowing recovery of a proprietary database, comprising:
   means for receiving, by a recovery server, a request from a client to restore a database;
   means for determining whether the request is legitimate by verifying a key database identification included in the request of the client;
   means for applying a recovery decision logic based on the key database identification matching a predetermined identification, and for granting the restore request to the client by the recovery server;
   means for forwarding an old local key to said client;
   means for decrypting the database with the old local key, and calculating a new local key,
   wherein at least one of said old local key and said new local key is based upon at least one unique characteristic of a hardware component associated with said database.

34. The system of claim 33, further comprising
   means for resetting parameters in a decision logic; and
   means for requesting another request from the client.

35. A signal-bearing medium tangibly embodying a program of machine-readable instructions executable by a digital processing apparatus to perform a method of storing information in a recoverable manner on an untrusted system, comprising:
   sending, by a client, a request to a recovery server for recovery of a failed database;
   determining whether said request is legitimate;
   based on said determining, sending a local key to the client;
   decrypting by said client the failed database with the local key; and
   re-encrypting the decrypted database with a new key,
   wherein at least one of said local key and said new key is based upon at least one unique characteristic of a hardware component associated with said database.

36. A signal-bearing medium tangibly embodying a program of machine-readable instructions executable by a digital processing apparatus to perform a method of allowing recovery of a proprietary database, comprising:
   receiving a restore request from a client, by a recovery server;
   determining, by the recovery server, whether the request is legitimate by verifying a key database identification included in the request of the client;
   based on the key database identification matching a predetermined identification, applying a recovery decision logic, and granting the restore request by the recovery server;
   forwarding an old local key from said recovery server to said client;
   decrypting the database using the old local key; and
   calculating a new local key,
   wherein at least one of said old local key and said new local key is based upon at least one unique characteristic of a hardware component associated with said database.

* * * * *